(12) United States Patent
Che et al.

(10) Patent No.: US 11,506,283 B2
(45) Date of Patent: Nov. 22, 2022

(54) GEAR SELECTION AND SHIFTING ACTUATING MECHANISM AND METHOD

(71) Applicant: WEICHAI POWER CO., LTD., Shandong (CN)

(72) Inventors: Wenchao Che, Shandong (CN); Yong Fang, Shandong (CN); Dejun Wang, Shandong (CN); Yunqian Qiao, Shandong (CN); Lipeng Sun, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 75 days.

(21) Appl. No.: 16/957,221

(22) PCT Filed: Jun. 20, 2018

(86) PCT No.: PCT/CN2018/091970
§ 371 (c)(1),
(2) Date: Jun. 23, 2020

(87) PCT Pub. No.: WO2019/178959
PCT Pub. Date: Sep. 26, 2019

(65) Prior Publication Data
US 2021/0003212 A1    Jan. 7, 2021

(30) Foreign Application Priority Data

Mar. 21, 2018  (CN) .......................... 201810234304.2
Mar. 21, 2018  (CN) .......................... 201820389667.9

(51) Int. Cl.
*F16H 61/28*     (2006.01)
*F16H 25/20*     (2006.01)
*F16H 61/32*     (2006.01)

(52) U.S. Cl.
CPC ......... *F16H 61/28* (2013.01); *F16H 25/2015* (2013.01); *F16H 61/32* (2013.01);
(Continued)

(58) Field of Classification Search
CPC .. F16H 61/32; F16H 2025/2053; F16H 61/28; F16H 2061/2884
See application file for complete search history.

(56) References Cited

U.S. PATENT DOCUMENTS 5,507,196 A     4/1996  Bailly et al.
9,441,729 B2 *  9/2016  Skogward ............. F16H 59/042
(Continued)

FOREIGN PATENT DOCUMENTS

CN      102207191 A     10/2011
CN      103836174 A     6/2014
(Continued)

OTHER PUBLICATIONS

EPO Extended European Search Report for corresponding EP Application No. 18910896.2; dated Sep. 16, 2021.
(Continued)

*Primary Examiner* — Jake Cook
(74) *Attorney, Agent, or Firm* — Cantor Colburn LLP

(57) ABSTRACT

An actuating mechanism includes a gear shifting motor, a first transmission gear, second transmission gears, gear shifting screws, a push block, a shift fork, a shift block and a linear driving device. An output shaft of the gear shifting motor is provided thereon with the first transmission gear engaged with the second transmission gears; the second transmissions gears are fixedly connected to the gear shifting screws; the gear shifting screws are in screw thread connection with the push block provided thereon with a through hole; one end of the shift block is connected to the linear driving device, and the other end is aligned with a groove on
(Continued)

the shift fork after inserting into the through hole. The linear driving device corresponding to a shift position drives the shift block; the gear shifting motor drives the first transmission gear; and the second transmission gears drive the gear shifting screws.

10 Claims, 2 Drawing Sheets

(52) U.S. Cl.
CPC ............... *F16H 2025/2053* (2013.01); *F16H 2061/2884* (2013.01)

(56) References Cited

U.S. PATENT DOCUMENTS 10,113,641 B2 * 10/2018 Kang .................. F16H 61/32
2012/0137812 A1 * 6/2012 Woo ..................... F16H 61/32
74/473.12
2017/0146120 A1   5/2017 Kang et al.

FOREIGN PATENT DOCUMENTS

| | | |
|---|---|---|
| CN | 104482198 A | 4/2015 |
| CN | 105909777 A | 8/2016 |
| DE | 102016223020 A1 | 6/2017 |
| EP | 2143980 A2 | 1/2010 |
| JP | 2002147602 A | 5/2002 |
| WO | 2015154769 A1 | 10/2015 |

OTHER PUBLICATIONS

International Search Report for corresponding International Application No. PCT/CN2018/091970; dated Aug. 14, 2018.

* cited by examiner

GEAR SELECTION AND SHIFTING ACTUATING MECHANISM AND METHOD

CROSS REFERENCE TO RELATED APPLICATIONS

This is the U.S. national stage application No. PCT/CN2018/091970, filed Jun. 20, 2018, Priority under 35 U.S.C. §119(a) and 35 U.S.C. §365(b) is claimed from Chinese patent application No. 201810234304.2 titled "GEAR SELECTION AND SHIFTING ACTUATING MECHANISM AND METHOD", filed on Mar. 21, 2018, and Chinese patent application No. 201820389667.9 titled "GEAR SELECTION AND SHIFTING ACTUATING MECHANISM", filed on Mar. 21, 2018, which are both incorporated herein by reference in their entireties.

FIELD

The present disclosure relates to the technical field of gear selection and shifting of AMT gearbox, and in particular to a gear selection and shifting actuating mechanism and a gear selection and shifting actuating method.

BACKGROUND

New energy-powered vehicles have developed rapidly, and convenient electrical resources have accelerated the development of automatic control of vehicles. Automatic gear shifting has become a mainstream of the development of new energy vehicles. At present, the faster-developing AMT gearbox realizes the automatic gear shifting function by adding a set of gear selection and shifting actuating mechanism and a TCU controller to the traditional gearbox. However, the reliability of the gear shifting of the AMT gearbox is not ideal. Failures such as unsuccessful gear engaging and incomplete gear disengaging occur frequently, which seriously affect driving safety.

At present, the working principle of the mainstream gear selection and shifting actuating mechanism in the market is to use a ball screw transmission system to achieve the gear selection and shifting functions. Each clearance between the shift forks is only 1.8 mm, plus various cooperation clearances in the transmission system, which increases the difficulty of controlling the position of the screw, which is also the reason why many cases of gear selection failure occur during the vehicle running. Furthermore, a displacement judgment of the gear selection is required, the gear shifting force is unbalanced, and the reliability is poor.

Therefore, how to provide a gear selection and shifting actuating mechanism to improve the reliability is a technical problem to be solved urgently by those skilled in the art.

SUMMARY

In view of this, one object of the present disclosure is to provide a gear selection and shifting actuating mechanism to improve reliability. Another object of the present disclosure is to provide a gear selection and shifting actuating method based on the above gear selection and shifting actuating mechanism.

In order to achieve the above objects, the following technical solutions are provided according to the present disclosure.

A gear selection and shifting actuating mechanism for an AMT gearbox, includes a gear shifting motor, a first transmission gear, a second transmission gear, a gear shifting screw, a push block, a shift fork, a shift block and a linear driving device, wherein multiple shift blocks, multiple linear driving devices, and multiple shift forks are provided; the shift blocks, the linear driving devices, and the shift forks have the same quantity and are provided corresponding to each other;

an output shaft of the gear shifting motor is provided with the first transmission gear, the first transmission gear is meshed with the second transmission gear, the second transmission gear is fixedly connected to the gear shifting screw, and the gear shifting screw is screwed to the push block; and the push block is provided with a through hole, one end of the shift block is connected to the linear driving device, and another end of the shift block is inserted into the through hole and aligned with a groove on the shift fork after passing out of the through hole.

Preferably, the second transmission gear includes a first sub-gear and a second sub-gear, the first sub-gear is located on one side of the first transmission gear and meshed with the first transmission gear, and the second sub-gear is located on another side of the first transmission gear and meshed with the first transmission gear;

the gear shifting screw includes a first sub-screw and a second sub-screw, a top end of the first sub-screw is coaxially and fixedly connected to the first sub-gear, and a top end of the second sub-screw is coaxially and fixedly connected to the second sub-gear;

the push block is provided with a first screw hole and a second screw hole which are spaced apart, the first sub-screw is arranged in the first screw hole, and the second sub-screw is arranged in the second screw hole; and the through hole is provided between the first screw hole and the second screw hole.

Preferably, an axis of the through hole is perpendicular to an axis of the first screw hole and an axis of the second screw hole.

Preferably, three shift blocks, three linear driving devices, and three shift forks are provided.

Preferably, the linear driving device is an air cylinder.

Preferably, a diameter of the second transmission gear is larger than a diameter of the first transmission gear.

Preferably, the gear shifting screw is screwed to the push block, specifically, the gear shifting screw is provided with a nut, and the nut is fixedly connected to the push block.

Preferably, the gear selection and shifting actuating mechanism further includes a sensor for detecting whether the shift block is inserted into the groove on the shift fork.

A gear selection and shifting actuating method based on the above gear selection and shifting actuating mechanism, includes driving the shift block to move and be inserted into the shift fork by the linear driving device corresponding to a required gear when a gear shifting is required; and performing a gear shift, wherein the gear shifting motor provides gear shifting power and drives the first transmission gear to rotate, the first transmission gear drives the second transmission gear to rotate, the second transmission gear drives the gear shifting screw to rotate, the gear shifting screw drives the push block to move by a rotation of the gear shifting screw itself, and while the push block moves, the shift block pushes the shift fork to shift the gear.

Preferably, the second transmission gear includes a first sub-gear and a second sub-gear, the first sub-gear is located on one side of the first transmission gear and meshed with the first transmission gear, and the second sub-gear is located on another side of the first transmission gear and meshed with the first transmission gear;

the gear shifting screw includes a first sub-screw and a second sub-screw, a top end of the first sub-screw is coaxially and fixedly connected to the first sub-gear, and a top end of the second sub-screw is coaxially and fixedly connected to the second sub-gear;

the push block is provided with a first screw hole and a second screw hole which are spaced apart, the first sub-screw is arranged in the first screw hole, and the second sub-screw is arranged in the second screw hole;

the through hole is provided between the first screw hole and the second screw hole, and multiple shift blocks, multiple linear driving devices, and multiple shift forks are provided, and they have the same quantity, when a gear shifting is required, the shift block is driven to move and be inserted into the shift fork by the linear driving device corresponding to a required gear; and then, a gear shift is performed, the gear shifting motor provides shifting power to drive the first transmission gear to rotate, the first transmission gear symmetrically transmits the power to the first sub-gear and the second sub-gear, the first sub-gear and the second sub-gear transmit the power respectively to the first sub-screw and the second sub-screw, rotation of the first sub-screw and the second sub-screw is converted into a linear reciprocating motion of the push block, and while the push block moves, the shift block pushes the shift fork to shift the gear.

The gear selection and shifting actuating mechanism for an AMT gearbox is provided according to the present disclosure, which includes a gear shifting motor, a first transmission gear, a second transmission gear, a gear shifting screw, a push block, a shift fork, a shift block and a linear driving device, wherein multiple shift blocks, multiple linear driving devices, and multiple shift forks are provided, and, the shift blocks, the linear driving devices, and the shift forks have the same quantity and are provided corresponding to each other; an output shaft of the gear shifting motor is provided with the first transmission gear, the first transmission gear is meshed with the second transmission gear, the second transmission gear is fixedly connected to the gear shifting screw, and the gear shifting screw is screwed to the push block; and the push block is provided with a through hole, one end of the shift block is connected to the linear driving device, and another end of the shift block is inserted into the through hole and aligned with a groove on the shift fork after passing out of the through hole.

In use, when a gear shifting is required, the shift block is driven to move and be inserted into the shift fork by the linear driving device corresponding to a required gear; and then a gear shift is performed, wherein the gear shifting motor provides gear shifting power and drives the first transmission gear to rotate, the first transmission gear drives the second transmission gear to rotate, the second transmission gear drives the gear shifting screw to rotate, the gear shifting screw drives the push block to move by a rotation of the gear shifting screw itself, and while the push block moves, the shift block pushes the shift fork to shift the gear. Therefore, the displacement judgment of the gear selection is dispensed with, and the gear shifting force is ensured to be balanced and reliable, improving the reliability.

BRIEF DESCRIPTION OF THE DRAWINGS

In order to more clearly describe the embodiments of the present disclosure or the technical solutions in the conventional technology, the drawings used in the description of the embodiments or the conventional technology will be briefly described below. Apparently, the drawings in the following description are merely embodiments of the present disclosure. For those of ordinary skill in the art, other drawings may be obtained according to the provided drawings without creative efforts.

Figure 1:
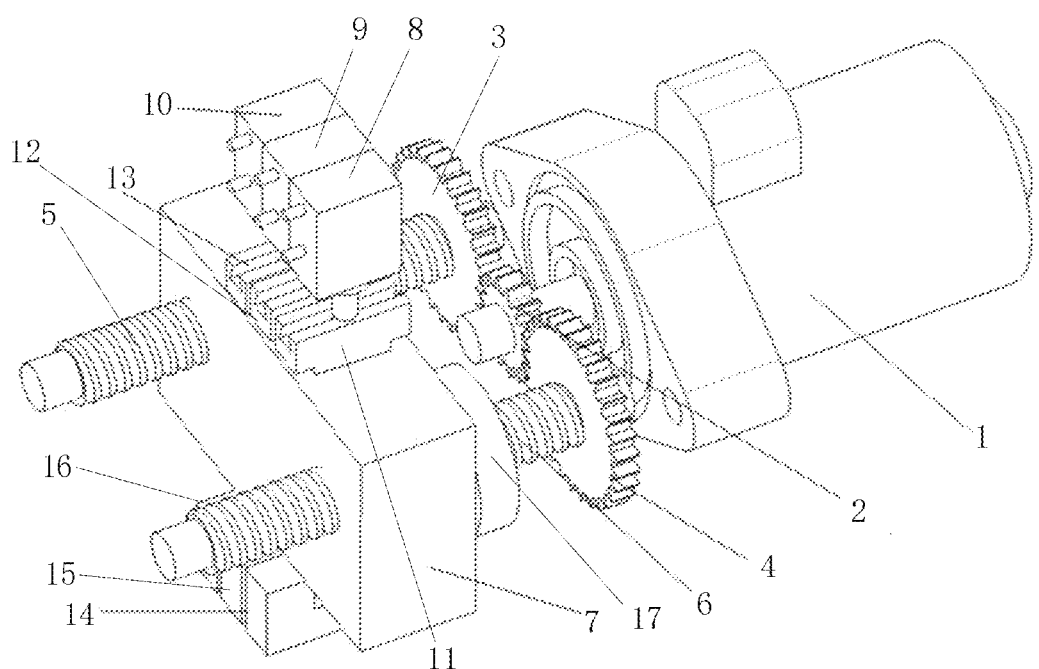
FIG. 1 is a schematic structural view of a gear selection and shifting actuating mechanism according to an embodiment of the present disclosure.

Reference numerals in FIG. 1:

| 1 gear shifting motor, | 2 first transmission gear |
|---|---|
| 3 first sub-gear, | 4 second sub-gear, |
| 5 first sub-screw, | 6 second sub-screw, |
| 7 push block, | 8 first air cylinder, |
| 9 second air cylinder, | 10 third air cylinder, |
| 11 first shift block, | 12 second shift block, |
| 13 third shift block, | 14 first shift fork, |
| 15 second shift fork, | 16 third shift fork, |
| 17 nut | |

DETAILED DESCRIPTION OF THE EMBODIMENTS

In order to make the objectives, technical solutions and advantages of embodiments of the present disclosure clearer, the technical solutions according to the embodiments of the present disclosure will be described clearly and completely as follows in conjunction with the drawings. It is apparent that the described embodiments are only a part rather than all of the embodiments according to the present disclosure. Based on the embodiments of the present disclosure, all other embodiments obtained without creative efforts by those of ordinary skill in the art shall fall within the protection scope of the present disclosure.

Referring to FIG. 1, FIG. 1 is a schematic structural view of a gear selection and shifting actuating mechanism according to an embodiment of the present disclosure.

Figure 3:
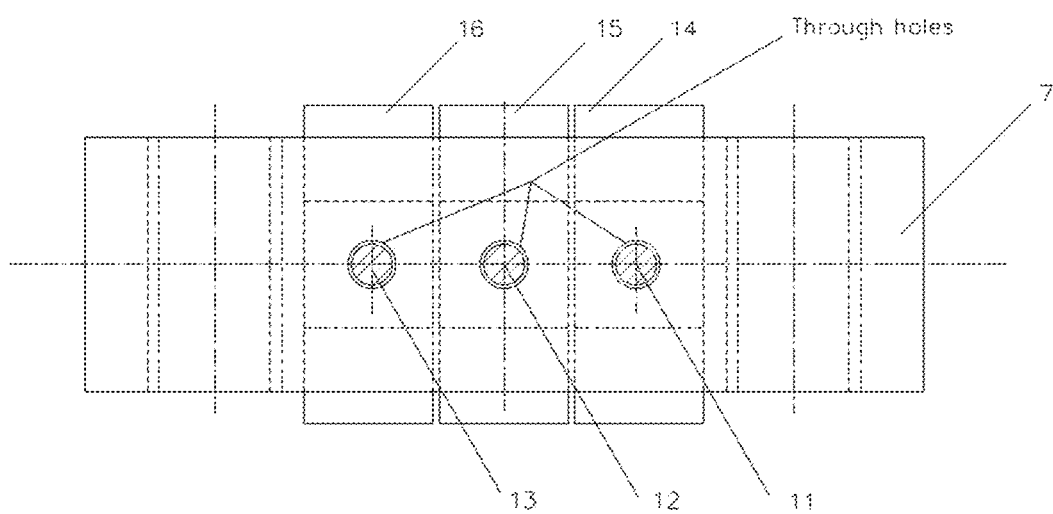
FIG. 3 is a schematic vertical view of the gear selection and shifting actuating mechanism according to an embodiment of the present disclosure.

The gear selection and shifting actuating mechanism for an AMT gearbox according to the embodiment of the present disclosure includes a gear shifting motor 1, a first transmission gear 2, a second transmission gear 3, a gear shifting screw, a push block 7, a shift fork, multiple shift blocks, multiple linear driving devices, and multiple shift forks, and, the shift blocks, the linear driving devices, and the shift forks have the same quantity and are provided corresponding to each other; an output shaft of the gear shifting motor 1 is provided with the first transmission gear 2, the first transmission gear 2 is meshed with the second transmission gear, the second transmission gear is fixedly connected to the gear shifting screw, and the gear shifting screw is screwed to the push block; and the push block 7 is provided with a plurality of through holes having the same quantity like the shift blocks, as shown in FIG. 3. One end of the respective shift block 13 is connected to the corresponding linear driving device 10, and another end of the respective shift block 13 is inserted into the corresponding through hole, and the respective shift block 13 and the corresponding linear driving device 10 is configured such that when a gear shifting is required the another end of the respective shift block 13 is aligned with a groove on the corresponding shift fork 16 after passing out of the corresponding through hole.

In use, when a gear shifting is required, the shift block is driven to move and be inserted into the shift fork by the linear driving device corresponding to a required gear; and then a gear shift is performed, wherein the gear shifting motor 1 provides gear shifting power and drives the first transmission gear 2 to rotate, the first transmission gear 2 drives the second transmission gear to rotate, the second transmission gear drives the gear shifting screw to rotate, the gear shifting screw drives the push block 7 to move by a rotation of the gear shifting screw itself, and while the push block 7 moves, the shift block pushes the shift fork to shift the gear. Therefore, a displacement judgment of the gear selection is dispensed with, and a gear shifting force is ensured to be balanced and reliable, improving the reliability.

The second transmission gear includes a first sub-gear 3 and a second sub-gear 4, the first sub-gear 3 is located on one side of the first transmission gear 2 and meshed with the first transmission gear 2, and the second sub-gear 4 is located on another side of the first transmission gear 2 and meshed with the first transmission gear 2. The gear shifting screw includes a first sub-screw 5 and a second sub-screw 6, a top end of the first sub-screw 5 is coaxially and fixedly connected to the first sub-gear 3, and a top end of the second sub-screw 6 is coaxially and fixedly connected to the second sub-gear 4. The push block 7 is provided with a first screw hole and a second screw hole, the first sub-screw 5 is arranged in the first screw hole, the second sub-screw 6 is arranged in the second screw hole, and the through hole is provided between the first screw hole and the second screw hole.

When a gear shifting is required, the shift block is driven to move and be inserted into the shift fork by the linear driving device corresponding to a required gear; and then, a gear shift is performed, the gear shifting motor 1 provides shifting power to drive the first transmission gear 2 to rotate, the first transmission gear 2 symmetrically transmits the power to the first sub-gear 3 and the second sub-gear 4, the first sub-gear 3 and the second sub-gear 4 transmit the power respectively to the first sub-screw 5 and the second sub-screw 6, rotation of the first sub-screw 5 and the second sub-screw 6 is converted into a linear reciprocating motion of the push block 7, and while the push block 7 moves, the shift block pushes the shift fork to shift the gear.

An axis of the through hole is perpendicular to an axis of the first screw hole and an axis of the second screw hole. The linear driving device is an air cylinder. The diameter of the second transmission gear is larger than the diameter of the first transmission gear 2. The gear shifting screw is screwed to the push block 7, specifically, the gear shifting screw is provided with a nut 17, and the nut 17 is fixedly connected to the push block 7. Each of the first sub-screw 5 and the second sub-screw 6 is provided with a nut 17.

The above gear selection and shifting actuating mechanism further includes a sensor for detecting whether the shift block is inserted into the groove on the shift fork. If the linear driving device is an air cylinder, the sensor is an air cylinder stroke sensor.

For ease of understanding, a five-speed gearbox is taken as an example to explain. Apparently, the number of parts with the gear selection function may be increased according to the increase of the gears to achieve the multi-gear selection function.

In this case, three shift blocks are provided, which respectively are a first shift block 11, a second shift block 12, and a third shift block 13; three linear driving devices are provided, that is, three air cylinders are provided, which respectively are a first air cylinder 8, a second air cylinder 9 and a third air cylinder 10; and three shift forks are provided, which respectively are a first shift fork 14, a second shift fork 15 and a third shift fork 16. The first air cylinder 8, the first shift block 11 and the first shift fork 14 are used in cooperation; the second air cylinder 9, the second shift block 12 and the second shift fork 15 are used in cooperation; and the third air cylinder 10, the third shift block 13 and the third shift fork 16 are used in cooperation. The first shift fork 14 corresponds to a 1st gear and a reverse gear, the second shift fork 15 corresponds to a 2nd gear and a 3rd gear, and the third shift fork 16 corresponds to a 4th gear and a 5th gear.

Figure 2:
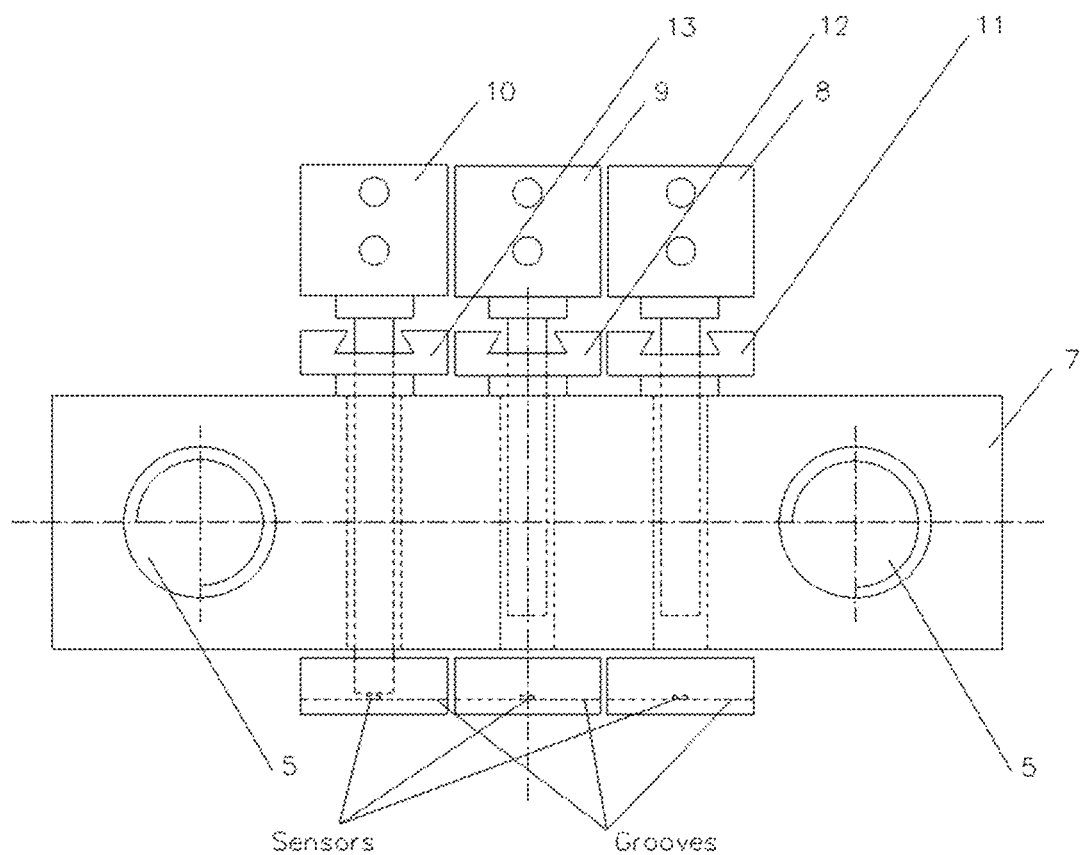
FIG. 2 is a schematic front view of the gear selection and shifting actuating mechanism according to an embodiment of the present disclosure.

When a demand for engaging the 4th gear is issued form the controller of the vehicle, as shown in FIG. 2, the third air cylinder 10 corresponding to the 4th and 5th gears performs an action to press down the third shift block 13, the third shift block 13 moves along the corresponding through hole until it is inserted into the third shift fork 16 corresponding to the 4th and 5th gears, and a signal of reaching a target position is sent to the controller by a corresponding air cylinder stroke sensor as shown in FIG. 2, so far the gear selection is completed; and then the gear shifting motor 1 drives the push block 7 to move, so that the shift fork 16 moves, completing the gear engaging. If the shift fork 16 moves forward to engage the 4th gear, then the gear shifting motor 1 drives the push block 7 to move forward; if the shift fork 16 moves backward to engage the 5th gear, the gear shifting motor 1 drives the push block 7 to move backward.

If the current gear is at the 4th gear position and the controller of the vehicle issues a demand for engaging the 5th gear, there is no need to select the gear. Driven by the gear shifting motor 1, the shift fork is moved in the opposite direction, directly completing the gear shift from the 4th gear to the 5th gear. In the gear selection process, under the action of the third air cylinder 10, the third shift block 13 can move down by only 10 mm to complete the gear selection, and the time required to complete this action is shorter than that of the ball screw gear selection system in the conventional technology.

If the current gear is at the 4th gear position and the controller of the vehicle issues a demand for engaging the 1st gear, the gear shifting motor 1 drives the push block to reset, and then the third air cylinder 10 drives the third shift block 13 to exit from the third shift fork 16, and the first air cylinder 8 corresponding to the 1st gear and the reverse gear operates to press down the first shift block 11. These two actions can be performed simultaneously. For the subsequent actions, reference may be made to the above description.

The gear selection and gear shifting of the reverse, 1st, 2nd and 3rd gears are the same as above.

Compared with the conventional technology, the gear selection and shifting actuating mechanism according to the embodiment of the present disclosure no longer uses a single gear shift finger to select and shift the gear, but uses three independent air cylinders to independently control three shift blocks to select the gear, and then uses the symmetrical ball screw transmission to shift the gear, which not only dispenses with the displacement judgment of the gear selection, but also ensures that the gear shifting force is balanced and reliable. Three independent air cylinders can achieve continuous gear selection and discrete gear selection, which can achieve continuous gear engaging and disengaging, and also can achieve discrete gear engaging and disengaging. Besides, a gear reduction mechanism is used to increase the second reduction ratio of the first transmission gear 2 and the second transmission gear before the first reduction ratio of the ball screw, which greatly achieves the effect of deceleration and torque increase, that is, the gear shifting force is increased and the power requirements of the motor is lowered, thereby increasing the reliability of the motor.

In actual work, the gear selection air cylinder is provided with three independent identical air cylinders; and the gear shifting motor 1 provides the gear shift power, wherein the gear shifting motor 1 is provided with a pinion shaft for mounting the first transmission gear 2 as a power input shaft, the pinion is meshed with the two large gears mounted on the screw, namely the first sub-gear 3 and the second sub-gear 4 of the second transmission gear, to symmetrically transmit the power to the two large gears. Each of the large gears is fixedly connected to the corresponding screw by a keyway, and the power is respectively transmitted to the corresponding screw by the two large gears. Rotation is converted into linear reciprocating motion of the nut by the ball screw transmission pair. The movements of the symmetrical ball screw nuts on both sides are synchronous, and the nuts 17 on both sides are fixedly connected to the push block 7 by bolts to synchronously transmit the push force to the push block 7. A sliding groove for the shift block up and down, that is, the through hole, is provide in the middle of the push block 7. The shift block is pressed down into the shift fork by the cylinder corresponding to the required gear, and the signal of reaching the target position is sent to the controller by the air cylinder stroke sensor. In this way, the gear selection operation is completed. Under the push of the push block, the shift fork is pushed to shift the gear.

The shift block in the gear selection and shifting actuating mechanism provided by the embodiment of the present disclosure implements gear shifting in a flat push manner. In this gear shifting method, the head structure of the shift block is simple, and is easier to process and heat treat.

Electric gear shifting and pneumatic gear selection are adopted in the gear selection and shifting actuating mechanism according to the embodiment of the present disclosure, each shift fork has its own independent shift block and air cylinder, and each air cylinder has an independent air cylinder stroke sensor, as shown in FIG. 2. Different from the ball screw type gear selection method in the conventional technology, the gear selection method of the gear selection and shifting actuating mechanism according to the embodiment of the present disclosure only requires to pluck and insert the shift block to complete the gear selection, and under the control of the vehicle controller, the upward and downward actions of different shift blocks can be performed simultaneously, greatly reducing the gear selection time; different from the gear shifting method of sliding the gear shifting finger in the conventional technology, the gear shifting method in the gear selection and shifting actuating mechanism according to the embodiment of the present disclosure is the flat push manner, the direction of the force is the same as the movement direction of the axis of the shift fork, which improves the transmission efficiency; with the symmetrical arrangement of the ball screw, the force of the ball screw pair is balanced, which can prolong the life of the ball screw; and by additionally providing the gear reduction pair, the effect of deceleration and torque increase is achieved, which can lower the power requirement of the motor, increase the gear shifting force of the shift block, and ensure the reliability of gear shifting. The gear selection and shifting actuating mechanism according to the embodiment of the present disclosure has the advantages of shorter gear shifting time, high reliability of gear selection and shifting, and large gear shifting force, and thus the vehicle can run more smoothly; and the structure of the gear selection and shifting actuating mechanism according to the embodiment of the present disclosure is simple, and only one motor is required for gear shifting, which is relatively easy to implement.

The above description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the present disclosure. Therefore, the present disclosure shall not be limited to the embodiments shown herein, but shall conform to the widest scope consistent with the principles and novel features disclosed herein.

The invention claimed is:

1. A gear selection and shifting actuating mechanism for an AMT gearbox, comprising a gear shifting motor, a first transmission gear, a second transmission gear, a gear shifting screw, a push block, a plurality of shift blocks, a plurality of linear driving devices, and a plurality of shift forks,
   wherein the shift blocks, the linear driving devices, and the shift forks have a same quantity and are provided corresponding to each other;
   wherein each shift fork corresponds to a required gear of the AMT gearbox,
   wherein an output shaft of the gear shifting motor is provided with the first transmission gear, the first transmission gear is meshed with the second transmission gear, the second transmission gear is fixedly connected to the gear shifting screw, and the gear shifting screw is screwed to the push block; and
   the push block is provided with a plurality of through holes having the same quantity like the shift blocks,
   wherein one end of the respective shift block is connected to the corresponding linear driving device, and another end of the respective shift block is inserted into the corresponding through hole, and
   wherein the respective shift block and the corresponding linear driving device is configured such that when a gear shifting is required the another end of the respective shift block is aligned with a groove on the corresponding shift fork after passing out of the corresponding through hole.

2. The gear selection and shifting actuating mechanism according to claim 1, wherein the second transmission gear comprises a first sub-gear and a second sub-gear, the first sub-gear is arranged on one side of the first transmission gear and meshed with the first transmission gear, and the second sub-gear is arranged on another side of the first transmission gear and meshed with the first transmission gear;
   the gear shifting screw comprises a first sub-screw and a second sub-screw, a top end of the first sub-screw is coaxially and fixedly connected to the first sub-gear, and a top end of the second sub-screw is coaxially and fixedly connected to the second sub-gear;
   the push block is provided with a first screw hole and a second screw hole which are spaced apart, the first sub-screw is arranged in the first screw hole, and the second sub-screw is arranged in the second screw hole; and the plurality of through holes is provided between the first screw hole and the second screw hole.

3. The gear selection and shifting actuating mechanism according to claim 2, wherein an axis of each of the plurality of through holes is perpendicular to an axis of the first screw hole and an axis of the second screw hole.

4. The gear selection and shifting actuating mechanism according to claim 2, wherein three shift blocks, three linear driving devices, and three shift forks are provided.

5. The gear selection and shifting actuating mechanism according to claim 1, wherein each of the plurality of the linear driving devices is an air cylinder.

6. The gear selection and shifting actuating mechanism according to claim 1, wherein a diameter of the second transmission gear is larger than a diameter of the first transmission gear.

7. The gear selection and shifting actuating mechanism according to claim 1, wherein the gear shifting screw being screwed to the push block is implemented by the gear shifting screw being provided with a nut and the nut being fixedly connected to the push block.

8. The gear selection and shifting actuating mechanism according to claim 1, further comprising a plurality of sensors each of which is configured to detect whether the respective shift block is inserted into the corresponding groove on the corresponding shift fork.

9. A gear selection and shifting actuating method applied to the gear selection and shifting actuating mechanism according to claim 1, comprising
driving the respective shift block to move and be inserted into the corresponding shift fork by the corresponding linear driving device corresponding to a required gear when a gear shifting is required; and
performing a gear shift, wherein the gear shifting motor provides gear shifting power and drives the first transmission gear to rotate, the first transmission gear drives the second transmission gear to rotate, the second transmission gear drives the gear shifting screw to rotate, the gear shifting screw drives the push block to move by a rotation of the gear shifting screw itself, and while the push block moves, the respective shift block pushes the corresponding shift fork to shift the gear.

10. The gear selection and shifting actuating method according to claim 9, wherein the second transmission gear comprises a first sub-gear and a second sub-gear, the first sub-gear is arranged on one side of the first transmission gear and meshed with the first transmission gear, and the second sub-gear is arranged on another side of the first transmission gear and meshed with the first transmission gear;
the gear shifting screw comprises a first sub-screw and a second sub-screw, a top end of the first sub-screw is coaxially and fixedly connected to the first sub-gear, and a top end of the second sub-screw is coaxially and fixedly connected to the second sub-gear;
the push block is provided with a first screw hole and a second screw hole which are spaced apart, the first sub-screw is arranged in the first screw hole, and the second sub-screw is arranged in the second screw hole;
the plurality of through holes is provided between the first screw hole and the second screw hole,
when a gear shifting is required, the respective shift block is driven to move and be inserted into the corresponding shift fork by the corresponding linear driving device corresponding to a required gear; and
then, a gear shift is performed, the gear shifting motor provides shifting power to drive the first transmission gear to rotate, the first transmission gear symmetrically transmits the power to the first sub-gear and the second sub-gear, the first sub-gear and the second sub-gear transmit the power respectively to the first sub-screw and the second sub-screw, rotation of the first sub-screw and the second sub-screw is converted into a linear reciprocating motion of the push block, and while the push block moves, the respective shift block pushes the corresponding shift fork to shift the gear.

\* \* \* \* \*